3,027,644
DENTAL INSTRUMENT
Vincent J. Piscitelli, 828 1st St., La Salle, Ill.
Filed Feb. 20, 1959, Ser. No. 794,592
5 Claims. (Cl. 32—69)

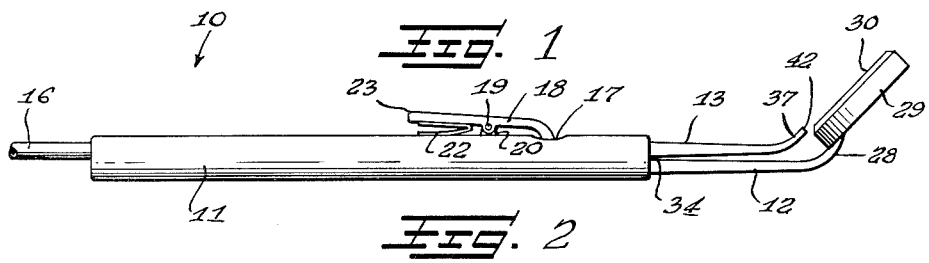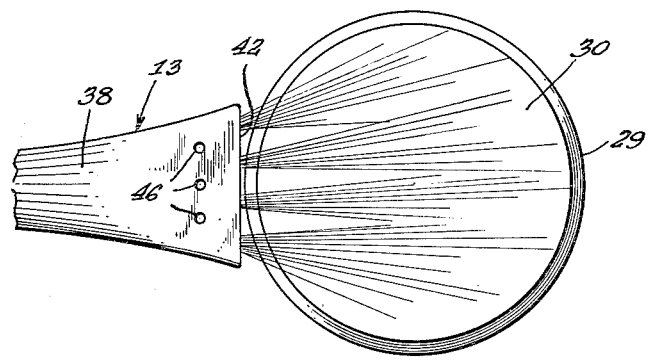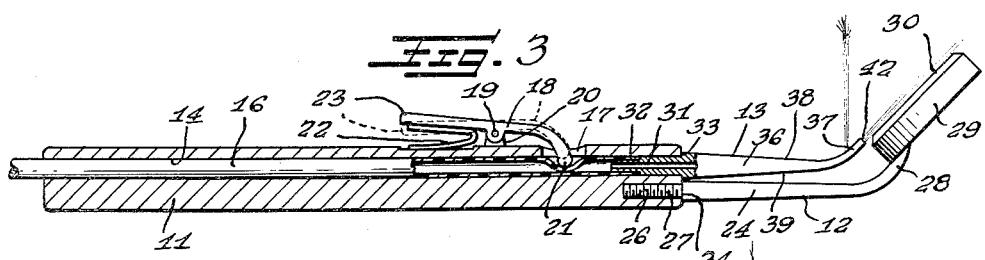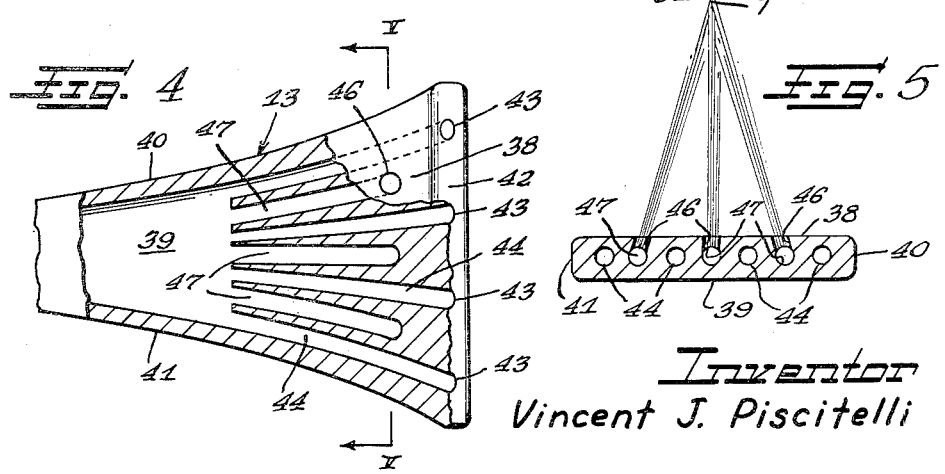
Inventor
Vincent J. Piscitelli

This invention relates generally to dental instruments and more particularly relates to a dental mirror including air nozzle means which not only prevent fogging of the mirror, but prevent mist and water propelled from high speed rotary drills and from ultrahigh speed rotary drills from collecting on the mirror surface, and which further directs a stream of air in the direction of the working field, thereby to afford the dental operator a dry field in which to work.

Although dental instruments heretofore provided have incorporated air releasing means in combination therewith, no one has provided a dental instrument or dental device which makes it practical to work on the upper or maxillary teeth affording the practical and safe use of ultrahigh speed drills. Accordingly, the dental devices used in conjunction with such ultrahigh speed equipment, as presently known, can only be used with safety and practicality on the lower or mandibular teeth.

Since contemporary high speed drilling equipment affords rotational speeds of 100,000 to 200,000 revolutions per minute, it is essential that dry mirrors be provided and the dental operator should also work in a field which is as dry as possible. Antifogging devices heretofore provided are not capable of protecting the mirror surface from a mist or spray of liquid particles directed at high velocity towards the mirror surface by high speed drilling devices.

In accordance with the principles of the present invention, a dental device is provided which includes a nozzle receiving air from a source at increased pressure and which nozzle is characterized by a generally divergent fan-shaped configuration terminating in an outlet having a row of laterally spaced apart outlet openings directing a plurality of air jets forming an air curtain for shielding the mirror surface. Thus, mist and water propelled from high speed rotary drills is prevented by the protective air curtain from collecting on the dental mirror positioned behind the air curtain.

It is further contemplated by the present invention to equip the nozzle with separate outlet openings directing a stream of air in offset relation to the air curtain protecting the mirror surface, thereby functioning to dry the operating field by a manipulation which is natural to a dental operator. By virtue of such provision, the device of the present invention makes it practical to work on all of the teeth including the maxillary teeth as well as the mandibular teeth.

It is an object of the present invention, therefore, to provide an improved dental instrument.

Yet another object of the present invention is to provide a dental mirror which includes not only antifogging features, but also means to prevent mist and water propelled from high speed rotary drills from collecting on the mirror surface.

Another object of the present invention is to provide an improved dry field dental mirror.

A further object of the present invention is to provide a dental instrument which exploits the principles of aerodynamics to shield the dental mirror from liquid particles thrown at increased velocity by drilling instruments.

Many other advantages, features and additional objects of the present invention will become manifest to those versed in the art upon making reference to the detailed description which follows and the accompanying sheet of drawings in which a dental instrument incorporating the principles of the present invention is shown by way of illustrative example.

On the drawings:
FIGURE 1 is a side elevational view of a dental instrument incorporating the principles of the present invention;
FIGURE 2 is an enlarged plan elevational view of the end portion of the dental instrument shown in FIGURE 1;
FIGURE 3 is a view generally similar to FIGURE 1 but shows a portion of the construction in cross-section to illustrate additional operating details thereof;
FIGURE 4 is an enlarged view of the nozzle incorporated in the device of the present invention with parts broken away to illustrate in cross-section additional details of construction; and
FIGURE 5 is a cross-sectional view taken generally on line V—V of FIGURE 4.

As shown on the drawings:
The dental instrument of the present invention is indicated generally at 10 and comprises an elongated handle 11 having connected thereto at one end thereof a bracket member 12 and a nozzle member indicated generally at 13.

As shown in greater detail in FIGURE 3, the elongated handle member 11 is particularly characterized by the formation therein of a through bore 14 forming an air passage and which may be conveniently lined with a tubular conduit 16 made of a flexible and elastic material and which is adapted to be connected to a source of air at increased pressure. It will be understood that the usual air compressor facilities generally available in dental offices can conveniently comprise the source of air at increased pressure and that the tubular conduit 16 will be connected in the usual manner to such air source.

The external surface of the elongated handle 11 is characterized by an opening 17 which intersects the through bore or passage 14 thereby exposing a portion of the tubular conduit 16. A manually operated valve 18 is pivotally carried as at 19 by a bracket 20 firmly attached to the elongated handle 11.

The valve member 18 comprises a valve head 21 which passes through the opening 17 and engages against the flexible elastic material of the tubular conduit 16. A spring member 22 is interposed between the elongated handle 11 and a manual operating portion 23 of the valve member 18, thereby to normally spring-bias the valve member 18 towards a closing position illustrated in full lines in FIGURES 1 and 3. It will be understood that when the portion 23 is manually depressed during operation of the device against the bias of the spring 22, the valve member 18 will be moved to the dotted line position shown in FIGURE 3 thereupon releasing the tubular conduit 16 and permitting air to flow at increased pressure through the passage.

Referring now to the bracket member 12, it will be noted that there is provided a shank portion 24 which extends generally parallel to the axis of the elongated handle 11 and the end of the handle 11 is characterized by the formation therein of a threaded recess 26, thereby to receive a correspondingly threaded portion 27 formed on the end of the shank 24. The bracket 12 is thus placed in firm assembly with the elongated handle 11.

At the free end of the bracket 12 there is formed an offset supporting portion 28, the angle of offset between the shank portion 24 and the supporting portion 28 being at a convenient angle to facilitate use of the instrument 10 in dental operations. The support portion 28 carries a generally disk-shaped mirror indicated at 29 and including the usual reflective surface herein indicated at 30. Thus, the reflective surface 30 is positioned at the same angle of offset as is determined by the offset between the support portion 28 and the shank portion 24.

Referring now to the nozzle member 13, it will be noted that the nozzle member includes a generally cylindrical inlet portion 31 which is sized to be received in press-fit relation in the end of the bore or passage 14. The end of the tubular conduit 16 fits over the inlet portion 31 and to expedite such coupling connection, suitable recess means may be provided at 32.

A shoulder is formed at 33 on the nozzle 13 which engages against the end surface 34 formed on the elongated handle 11.

The nozzle member 13 includes a body portion 36 which extends outwardly from the end of the handle 11 and which is generally parallel to the shank 24 of the bracket 12 and has formed at the end thereof an outlet portion 37 which is offset at the same angle as the mirror surface 30, thereby to permit the outlet portion 37 to terminate closely adjacent one peripheral edge of the mirror surface 30.

The nozzle member 13 is particularly characterized by upper and lower wall portions indicated at 38 and 39, respectively. Although the upper and lower wall portions 38 and 39 converge slightly with respect to one another, it will be appreciated that the upper and lower wall portions 38 and 39 are generally parallel to the shank portion 24.

The nozzle member 13 further includes oppositely disposed side wall portions indicated at 40 and 41, respectively. The side wall portions 40 and 41 diverge generally outwardly from the inlet portion 31, thereby forming a generally fan-shaped member which gradually increases in width but decreases in thickness. The nozzle member 13 has an end face 42 which constitutes a rather wide but shallow outlet having a plurality of laterally spaced apart outlet openings 43 formed therein.

Referring specifically to FIGURE 4, it will be noted that the nozzle member 13 includes means forming separate passages 44 for each respective outlet opening 43, which passages 44 extend away from the end wall 42 and which communicate with the inlet portion 31.

The upper wall 38 of the nozzle is further characterized by means forming an outlet therein through which air is directed to dry the operating field by a manipulation which is natural to a dental operator. More specifically, the upper wall portion 38 of the nozzle member 13 has formed therein a plurality of laterally spaced apart outlet apertures or openings indicated at 46.

The nozzle member 13 further includes means forming separate passages 47 for each respective aperture 46 and which passages extend away from the upper wall 38 into communication with the inlet portion 31.

Referring specifically to FIGURE 5, it will be noted that the passages formed by the apertures 46 are constructed and arranged so that the outermost of the openings or apertures 46 are inclined inwardly, while the centermost opening or aperture 46 extends in normal or perpendicular relation to the upper wall surface 38. By such construction and arrangement, all of the air streams or jets directed outwardly from the openings or apertures 46 are aimed at a common area or target indicated on FIGURE 5 at T. Such target is spaced upwardly from the surface of the nozzle provided by the upper wall 38 and it will be understood that such provision is made so that the merging air jets will effectively dry the operating field. Moreover, since such air jets are directed upwardly, the normal manipulation of the dental mirror 10 by the action which is natural to a dental operator will permit aiming and directing the target area T throughout the field of operation, thereby promoting a dry field for the operator.

The disposition of the outlet openings 43 and the association therewith of the air passages 44 is such that a plurality of air jets are directed outwardly from the end wall 42 and form an air curtain which effectively shields the mirror surface 30. The fast moving air jets protect the mirror surface 30 against accumulation of mist and water propelled at high speed by the drilling equipment. Such moisture as does engage the mirror surface 30, for example, by contact with the oral surfaces of the patient, is rapidly dissipated by the rapid expansion of air leaving the nozzle 13. Thus, the mirror surface is maintained in such condition that the dental operator can effectively utilize contemporary high speed equipment on both maxillary and mandibular teeth.

Although minor modifications might be suggested by those versed in the art, it should be understood that I wish to embody within the scope of the patent warranted hereon all such modifications as reasonably and properly come within the scope of my contribution to the art.

I claim as my invention:

1. In a dental mirror, a nozzle receiving air from a source at increased pressure having an inlet at one end and an outlet at the other end, said nozzle having upper and lower walls and further including side walls diverging outwardly from said inlet towards said outlet, said nozzle having a narrow elongated end wall at said outlet end with a row of spaced apart outlet openings formed therein to direct a plurality of air jets in the form of an air curtain for shielding the dental mirror, said upper wall having a row of laterally spaced apart apertures formed therein providing a separate outlet to discharge an air stream in the form of a plurality of jets for use at the field of dental operation.

2. In a dental mirror as defined in claim 1, each of said apertures being formed in said upper wall to direct a corresponding jet towards a common point.

3. In a dental mirror as defined in claim 2, said nozzle including means forming separate passages for each said aperture and extending away from said upper wall for communication with said inlet.

4. In a dental mirror, a nozzle receiving air from a source at increased pressure having an inlet at one end and an outlet at the other end, said nozzle having an upper wall and further including side walls diverging outwardly from said inlet toward said outlet, said nozzle having a narrow elongated end portion at said outlet end with outlet means formed therein to direct a stream of air in the form of an air curtain for shielding the dental mirror, said upper wall having a separate outlet means formed therein to discharge an air stream at an angle offset from said air curtain for use at the field of dental operation.

5. A dental instrument comprising an elongated handle having a valve controlled air passage extending therethrough, a support means at the end of said handle including a portion offset angularly relative to the longitudinal axis of the handle, and a disk-like reflecting mirror carried on said offset portion, said support means including a nozzle portion receiving air from a source at increased pressure via said handle, said nozzle portion having an inlet connected to said air passage and an outlet, said nozzle having side walls diverging outwardly from the inlet to the outlet and terminating in a narrow elongated outlet end disposed in a plane substantially parallel to and adjacent to one side of said reflecting member in which said outlet is formed to direct a stream of air in the form of an air curtain over said reflecting member for shielding the reflective surface thereof, said nozzle portion including an upper wall disposed at the angle of the plane including said reflecting member, and separate outlet means formed in said upper wall communicating with said air passage to discharge an air stream at an angle offset from said air curtain for use at the field of dental operation.

(References on following page)

References Cited in the file of this patent

UNITED STATES PATENTS

| | | |
|---|---|---|
| 1,905,633 | Feltham | Apr. 25, 1933 |
| 2,685,146 | Stevens | Aug. 3, 1954 |
| 2,779,100 | Claessens | Jan. 29, 1957 |
| 2,796,506 | Lumbert | June 18, 1957 |
| 2,834,109 | O'Hara | May 13, 1958 |
| 2,907,110 | O'Hara | Oct. 6, 1959 |

FOREIGN PATENTS

| | | |
|---|---|---|
| 162,055 | Sweden | Feb. 4, 1958 |